Sept. 14, 1926.
E. CROWLEY
SWING SUPPORTING BEARING
Filed Nov. 12, 1923
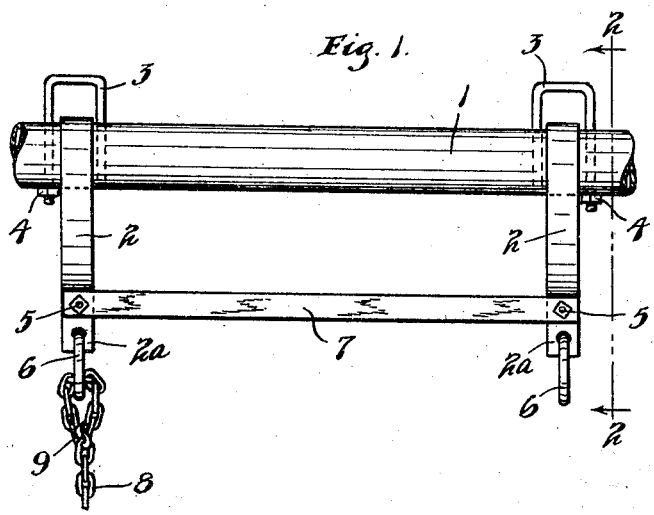
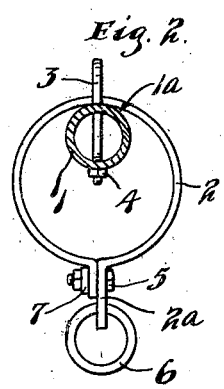
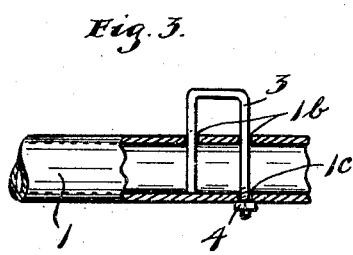
INVENTOR.
EDWIN CROWLEY.
BY HIS ATTORNEY.
James F. Williamson Patented Sept. 14, 1926.

1,599,656

UNITED STATES PATENT OFFICE.

EDWIN CROWLEY, OF MINNEAPOLIS, MINNESOTA.

SWING-SUPPORTING BEARING.

Application filed November 12, 1923. Serial No. 674,124.

This invention relates to a supporting device and particularly to such a device adapted to support a swinging flexible member of a swing or similar apparatus. Swings of various sorts are now extensively used in playgrounds which are continually increasing in number and it is important to have a safe, inexpensive and efficiently operating supporting device for such swings.

It is an object of this invention, therefore, to provide a simple and efficient swing supporting device in which the flexible members extending from the swing have substantially no sliding or scraping movement on the support.

It is another object of the invention to provide such a support comprising a rigidly supported member having a curved upper surface embraced by spaced annular members of much larger diameter adapted to have a rolling contact with said device, which latter members carry means for supporting the flexible swing supporting member.

It is more specifically an object of the invention to provide a device comprising a rigidly supported cylindrical member embraced by spaced rings of much larger diameter, said rings carrying rigid depending lugs in which are received smaller links or rings adapted to carry the flexible swing members together with means on said cylindrical support for preventing lateral movement of said first mentioned rings.

These and other objects and advantages of the invention will be more fully set forth in the following description made in connection with the accompanying drawings in which like reference characters refer to the same parts throughout the different views, and in which, Fig. 1 is a view in front elevation of the device;

Fig. 2 is a vertical section taken on the line 2—2 of Fig. 1, as indicated by the arrows; and Fig. 3 is a partial view similar to Fig. 1, but partly in vertical section.

Referring to the drawings, the device comprises a member 1 extending longitudinally between any suitable supporting means and rigidly held therein. The member 1 has a convex curved upper surface 1ª and said member conveniently may take the form of a cylindrical member such as an iron pipe. Rings 2 surround the members 1 at spaced points and are maintained in comparatively fixed spaced relation thereon by the members 3. While the members 3 may take various forms, in the embodiment of the invention illustrated, they are formed as simple U-shaped members bent from a single rod, one end of which is somewhat longer than the other and is threaded. The sides of member 3 project through holes 1ᵇ in the member 1 and the threaded side extends through another hole 1ᶜ and receives a nut 4 thereon which is tightened to clamp the member securely in position, the unthreaded side of the members 3 contacting the inner side of the member or pipe 1. The rings 2 preferably are formed of a flat bar and, as illustrated, the ends of the bar are bent radially and secured together by headed and nutted bolts 5. One end of the bar 2ª is projected to form a lug and is transversely apertured. The link 6, illustrated as a circular ring, extends through the aperture in the lug 2ª and has its axis extending parallel to and substantially vertically alined with the axis of the ring 2 and the axis of member 1. The lugs 2ª on the rings 2 are connected by a bar 7 apertured at its ends to receive the bolts 5 and secured thereby. Flexible members 8 of the swing which, in the embodiment of the invention illustrated are shown as chains, are looped through the ring 6. As shown, one end of said chains carries a hook 9 which is merely hooked through one of the chain links.

In operation, the swing will move in a plane extending at right angles to the axis of member 1. The flexible members 8 and links 6 will have substantially no relative motion but will move with the rings 2. The latter will move relatively to the member 1 and the inner concave surface of said rings will move over the convex surface 1ª of the member 1 with a rolling contact, thus causing very little wear between said members. The rings 2 are kept in correct position by the members 3 and are further caused to move substantially in unison by a cross bar 7. This cross bar 7 serves an efficient purpose and tends to prevent gyrating movement of the members 8, thus acting to keep the swing moving in a plane at right angles to the member 7. This is important in playground swings where the same are supported close to each other in a row, as a gyrating swing often collides with the adjacent swing causing injury to children.

From the above description it is seen that applicant has provided an extremely simple and efficient swing support. The parts can be made of material of a very simple nature and which is very easily procured. The device is quite rugged, operates with a minimum of noise and wear and is easily installed. The same has been amply demonstrated in actual practice and found to be very efficient and successful.

It will, of course, be understood, that various changes may be made in the form, details, arrangement and proportions of the parts without departing from the scope of applicant's invention, which, generally stated, consists in a device capable of carrying out the objects above stated, such as shown and described and set forth in the appended claims.

What is claimed is:

1. A swing support comprising a cylindrical supporting bar, spaced rings made from flat sheet material of appreciably larger diameter than said bar, loosely surrounding the same and contacting the top thereof, means for connecting the lower ends of said rings to the swing arms of a swing, and a rigid strut bar connecting together the lower portions of said rings whereby when the swing is swung gyroscoping movement thereof will be prevented.

2. A swing support comprising a cylindrical supporting bar, rings supporting said bar, means for connecting the swing arms of a swing to said rings and U shaped rods extending into and secured in said bar and enclosing said rings to prevent the longitudinal movement thereof on said bar.

3. A swing support having in combination a cylindrical supporting bar, spaced rings of appreciably larger diameter than said bar surrounding the same and contacting the top surface of said bar, means connected to said rings and movable therewith adapted to be connected to the flexible bars of said swing whereby in the motion of said swing said rings roll on said bar and the line of contact of each ring and bar moves back and forth across the top generatrix line of said bar, and U shaped rods extending into and secured in said bar enclosing said rings to prevent movement thereof longitudinally of said bar.

4. A swing support comprising a cylindrical supporting bar, spaced rings of appreciably larger diameter than said bar loosely surrounding the same and contacting the top thereof, means for connecting the lower ends of said rings to the side members of a swing, and means on said bar at both sides of said rings for preventing movement of said rings longitudinally of said bar.

In testimony whereof I affix my signature.

EDWIN CROWLEY.